Aug. 15, 1950  J. D. WILDE  2,519,167
AUTO SAFETY SWITCH
Filed July 9, 1948  2 Sheets-Sheet 1

Inventor
John D. Wilde

By Clarence A. O'Brien
and Harvey B. Jacobson
Attorneys

Aug. 15, 1950        J. D. WILDE        2,519,167

AUTO SAFETY SWITCH

Filed July 9, 1948        2 Sheets-Sheet 2

Inventor

John D. Wilde

By Clarence A. O'Brien
and Harvey B. Jacobson
Attorneys

Patented Aug. 15, 1950

2,519,167

UNITED STATES PATENT OFFICE 2,519,167

AUTO SAFETY SWITCH

John D. Wilde, Los Angeles, Calif.

Application July 9, 1948, Serial No. 37,919

3 Claims. (Cl. 200—163)

Fires frequently start in motor vehicles or the like, due to short circuiting of the electrical connections therein, frequently when the owner is not nearby so that he may readily detect signs of fire, and as a result the motor vehicle itself as well as the garage wherein it is housed may burn. It is the purpose of the instant invention to disconnect the electric circuit so that accidental fire cannot occur. And as an auxiliary advantage of the instant device, if connected in an inconspicuous place in the motor vehicle, it will assist in preventing automobile thefts. In attempting to steal the car, the thief, not knowing where the disconnecting switch is located or not being aware of such a device, is not able to start the automobile, even though he rigs up what is known as a "hot shot" in order to accomplish his object.

The object of the invention is to provide a cut-out switch particularly adapted for use in connection with motor vehicles as a means to be disposed adjacent a storage battery on the latter but operated from the interior of the vehicle, so as to be operated to definitely break the circuit at the battery, thus serving to insure against fire or theft at a time when the operator or owner of the vehicle is away from the same; to provide a switch of the type indicated which may be readily installed to any conventional motor vehicle without modification thereof, and generally to provide a cut-out switch, which, while of the heavy construction necessary to carry the heavy current of the battery in starting the vehicle motor, is of simple form and susceptible of inexpensive manufacture.

With these objects in view, the invention consists in the construction and combination of parts of which a preferred embodiment is illustrated in the accompanying drawings, but to which the embodiment of the invention is not limited. It is obvious that certain changes will occur to those skilled in the art without departing from the spirit of the invention or the scope of the appended claims.

Figure 1:
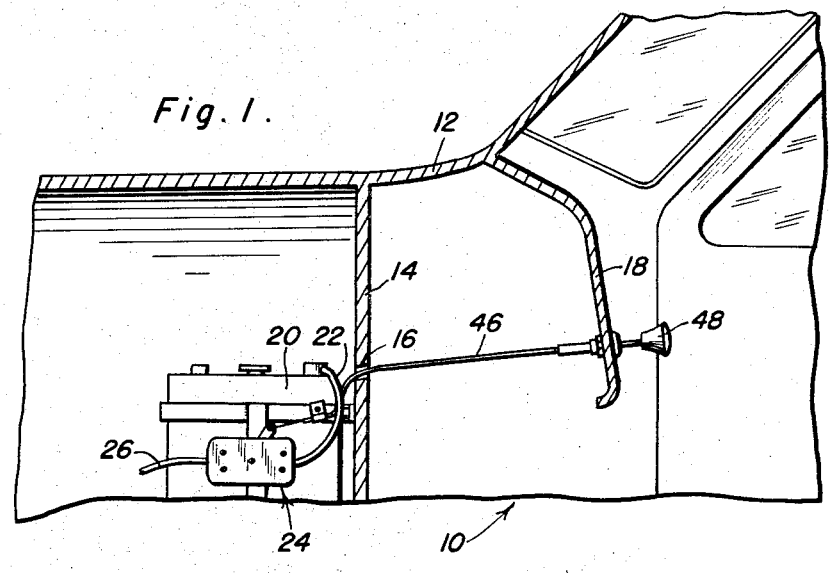
Figure 1 is a view of the invention as secured in position in a motor vehicle.

Referring to Figure 1 particularly, a motor vehicle 10 is illustrated in fragmentary sectional view and discloses a cowl 12, a fire wall 14 with a suitable aperture 16 therethrough, and a dash 18. A battery 20 is connected by means of suitable wire or cable 22 to the cut-out or safety switch of the invention 24; cable or wire 26 leading from the other side thereof to a starter switch (not shown).

Referring to Figures 2 through 6, the cut-out switch consists of a rectangular backing plate 28 and a cover plate 30, cover plate 30 including opposed parallel sides 32 and 34. Sides 32 are apertured axially to extend approximately from the bottom thereof to a point midway toward cover plate 30 at 36, and one side 34 includes a rectangular opening or doorway 38 to receive therethrough for pivotal or reciprocating action a lever 40 secured in housing 24 in a manner soon to appear. Lever 40 contains a boss 42 apertured at 44 to receive therethrough a stiff wire or rod 46 which, in turn, is connected to a pull knob 48 secured on dash 18 of motor vehicle 10. Thus, when knob 48 is pulled out, or pushed inwardly, wire 46 is of sufficient rigidity to pivot or oscillate lever 40 in cut-out switch 24. Backing plate 28 and cover plate 30 as well as sides 32 and 34 are made of any non-conductor material, such as plastics, or the like, to provide suitable insulation for the device.

A pair of oppositely disposed rectangular plates 50 of brass or copper construction are placed between the extremities of backing plate 28 adjacent walls 32 and are centrally bushed or upstruck at 52 to receive the ends of cables 26 and 22, respectively. The outer extremities of each plate 50 are bent over to form a bearing member or sleeve 54. Thus, there are a total of four bearings 54 in the device. As is clearly illustrated in Figure 6, backing plate 28 is counterbored at 56 between struck section 52 and bearing sleeve 54 to receive therethrough securing bolt 58, bolt 58 being of such length to extend just below the upper surface of cover plate 30 through a suitable bore 60 therein. Washer 62 is provided and lock nut 64 is retained on bolt 58 to secure it in rigid position. It will be noted that in this manner a smooth surface is presented at all times, there being no projection of screw heads or the like. Detent or indented portion 66 is provided for member 52 to "bite" into the end of cables 22 and 26 for securing relation therein.

The inner end of lever 40 acts as a spacing block 68 and is axially bored at 70 the length thereof for receiving therethrough securing bolt 74. Bolt 74 is headed at 76 to seat against backing plate 28 and extend therethrough through suitable aperture 78 its threaded extremity thereof extending through threaded aperture 80 on cover plate 30 and countersunk at 82 to receive lock nut 84 therein. It will be noted that securing bolt 74 serves as the axis of handle or lever 40 as well as the means for securing cover plate 30 to backing plate 28.

Figure 3:
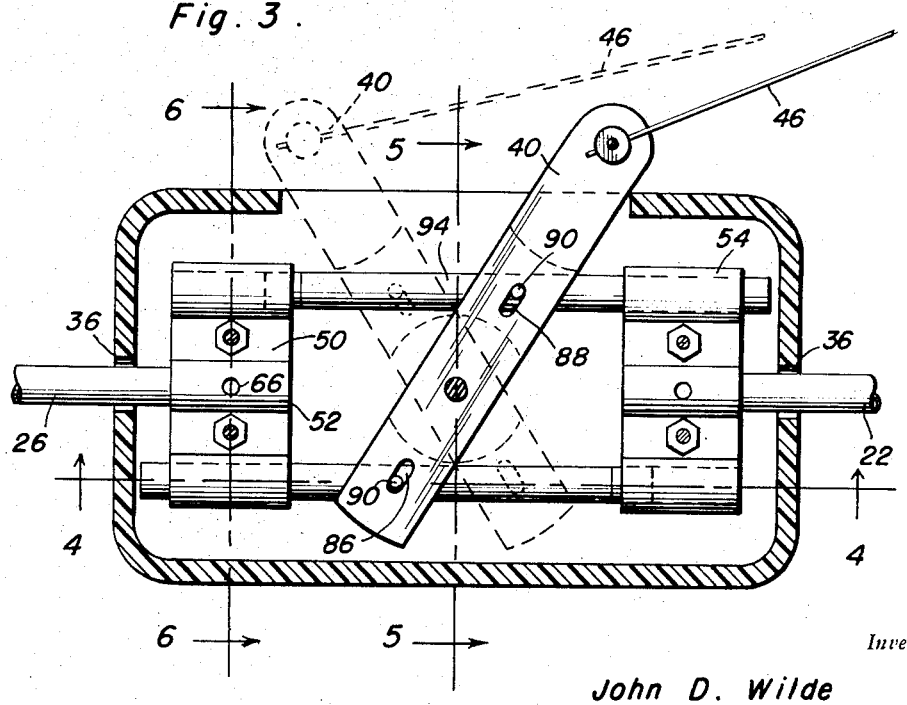
Figure 3 is a top plan view of the circuit breaking element, with the major portion of the top of the housing removed.
Figure 2:
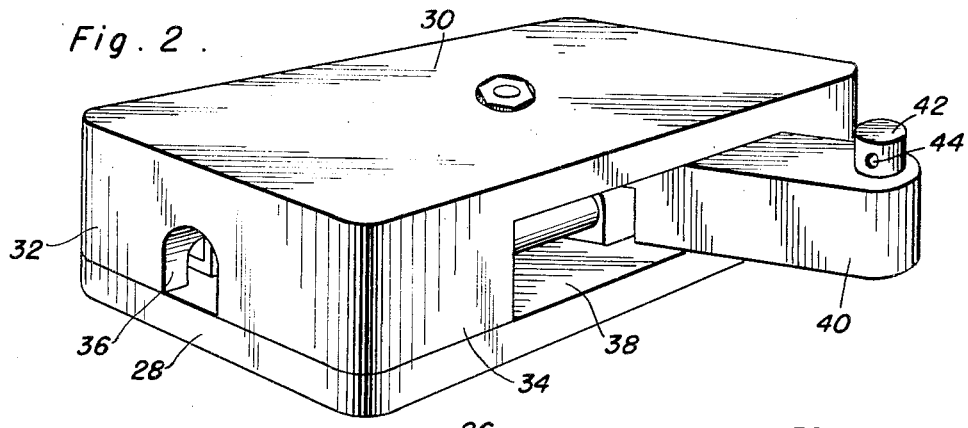
Figure 2 is a perspective view of the invention enclosed in a suitable housing.
Figure 4:
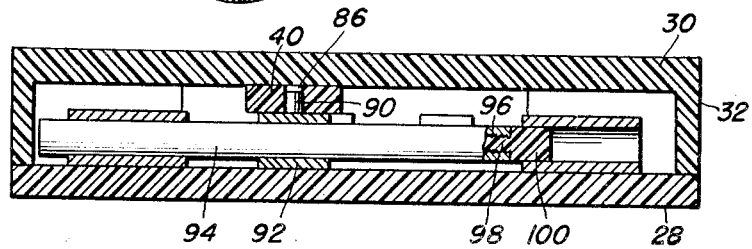
Figure 4 is a vertical transverse sectional view of the invention and is taken substantially on the line 4—4 of Figure 3.
Figure 5:
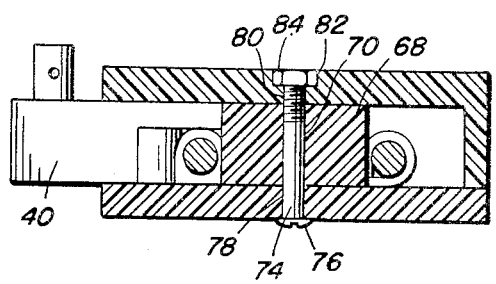
Figure 5 is a transverse view of the invention and is taken substantially on the line 5—5 of Figure 3.
Figure 6:
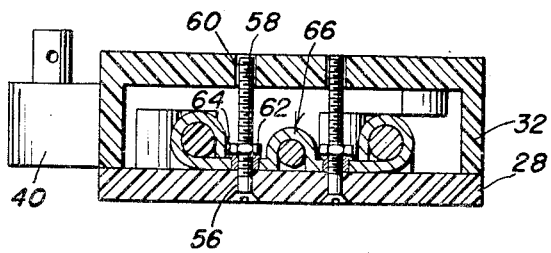
Figure 6 is a transverse sectional view and is taken substantially on the line 6—6 of Figure 3.

Lever 40 is slotted at 86 and 88, as is clearly seen in Figure 3 to receive therethrough vertical pins 90 which, in turn, are integral with collars 92 preferably of brass. Collars 92 (Figure 4) are secured to brass tubing or conductor rods 94. Tubing 94 is adapted to reciprocatingly slide within bearing 54 aligned in plate 50.

One extremity of each rod 94, but in diagonal relation, is counterbored and threaded on the interior thereof at 96, to receive therein the externally threaded leg 98 depending from hard fiber head 100. Fiber head or guide plug 100 is of a diameter equal to the outer diameter of tubing 94, although of solid construction and is of non-conductive material.

If desired, a shim or conductor plate is secured between terminal plate 50 and the non-conducting backing plate 28.

In operation, the device is secured in the manner illustrated in Figure 1, and handle 48 is pulled outwardly. This causes lever 40 to pivot in the position illustrated in Figure 3, thereby causing tubing 94 to pull in opposite directions by means of engagement of pin 90 in slots 86 and 88, until fiber head 100 is in the position illustrated in Figure 4. The electric circuit is now broken and there is no danger of accidental short circuiting. When knob 48 is again pushed forward, lever 40 assumes the dotted line position illustrated in Figure 3, thereby moving fiber head 100 through the outer extremities of bearings 54 and permitting the brass portion 94 to engage bearings 54 and close the electric circuit. The motor vehicle is now ready to be operated.

From the above description, it is readily apparent that the various objects of the invention have been achieved.

While the foregoing specification sets forth the invention in specific terms, it is to be understood that numerous changes in shape, size and materials may be resorted to without departing from the spirit and scope of the invention as explained hereinafter.

Having described the invention what is claimed as new is:

1. A safety switch comprising a casing having an end wall including an elongated slot, a lever extending through said slot and pivoted intermediate its ends in said casing for vertical movement, a pair of opposed terminals in said casing, each of said terminals including inner and outer sleeves in alignment with corresponding sleeves of the other terminal, conductive wires connected to a source of electric current and removably secured in said inner sleeves, conductive rods reciprocatingly received in said outer sleeves, means operatively connecting said rods to said lever, a first non-conductive head carried at one end of one of said rods and of equal diameter therewith, and a second non-conductive head carried at the non-corresponding end of the other of said rods and of equal diameter therewith.

2. The combination of claim 1 wherein said means includes slots in said lever at both sides of the pivot point thereof and pins carried by said rods and extending through said slots.

3. A safety switch comprising a casing having an end wall including an elongated slot, a lever extending through said slot and pivoted intermediate its ends in said casing for vertical movement, a pair of opposed terminals in said casing, each of said terminals including an inner sleeve and a pair of outer sleeves, the sleeves of one of said terminals being in horizontal alignment with the corresponding sleeves of the other of said terminals, conductive wires connected to a source of electric current and removably secured in said inner sleeves, a first conductive rod reciprocatingly received in one pair of said aligned outer sleeves, a second conductive rod reciprocatingly received in the other pair of said aligned outer sleeves, means operatively connecting said rods to said lever, a first non-conductive head carried at one end of said first rod and of equal diameter therewith, and a second non-conductive head carried at the non-corresponding end of said second rod and of equal diameter therewith.

JOHN D. WILDE.

REFERENCES CITED

The following references are of record in the file of this patent:

UNITED STATES PATENTS

| Number | Name | Date |
|---|---|---|
| 964,536 | McLewee | July 19, 1910 |
| 992,478 | Birnn | May 16, 1911 |
| 1,623,937 | Gizewski | Apr. 5, 1927 |